(12) United States Patent
Koletzko

(10) Patent No.: US 8,439,303 B2
(45) Date of Patent: May 14, 2013

(54) RETRACTABLE UNDERCARRIAGE FOR AN AIRCRAFT

(75) Inventor: Wolfram Koletzko, Kolbermoor (DE)

(73) Assignee: Eurocopter Deutschland GmbH, Donawoerth (DE)

( * ) Notice: Subject to any disclaimer, the term of this patent is extended or adjusted under 35 U.S.C. 154(b) by 340 days.

(21) Appl. No.: 12/726,391

(22) Filed: Mar. 18, 2010

(65) Prior Publication Data

US 2011/0049293 A1 Mar. 3, 2011

(30) Foreign Application Priority Data

Aug. 29, 2009 (EP) .................................... 09400040

(51) Int. Cl.
*B64C 25/10* (2006.01)
*B64C 25/52* (2006.01)

(52) U.S. Cl.
USPC .................... 244/102 A; 244/102 R; 244/108

(58) Field of Classification Search .............. 244/102 R, 244/102 A, 108; 254/85; 74/89.34
See application file for complete search history.

(56) References Cited

U.S. PATENT DOCUMENTS

| | | | | | |
|---|---|---|---|---|---|
| 2,279,615 | A | * | 4/1942 | Bugatti | 244/102 R |
| 2,446,393 | A | * | 8/1948 | Russell | 74/388 R |
| 2,455,368 | A | * | 12/1948 | Hoffar | 74/424.86 |
| 2,530,871 | A | * | 11/1950 | Gossling | 74/25 |
| 2,574,404 | A | * | 11/1951 | Levy | 244/102 R |
| 2,612,230 | A | * | 9/1952 | Jezler | 244/102 R |
| 2,741,446 | A | * | 4/1956 | Jakimiuk | 244/102 R |
| 2,772,841 | A | * | 12/1956 | Bonsteel | 74/89.34 |
| 2,980,368 | A | * | 4/1961 | Jakimiuk et al. | 244/102 R |
| 3,387,802 | A | * | 6/1968 | Cruz | 244/102 R |
| 3,691,858 | A | * | 9/1972 | Wilke | 74/89.34 |
| 4,558,837 | A | * | 12/1985 | Mens et al. | 244/108 |
| 4,703,666 | A | * | 11/1987 | Fickler | 74/89.31 |
| 5,128,688 | A | * | 7/1992 | West | 74/424.87 |
| 5,199,764 | A | * | 4/1993 | Robinson | 74/89.23 |
| 5,211,359 | A | * | 5/1993 | Rene et al. | 244/108 |
| 5,224,669 | A | * | 7/1993 | Guimbal | 244/108 |
| 5,265,491 | A | * | 11/1993 | Nishiumi | 74/89.41 |
| 5,269,481 | A | * | 12/1993 | Derrien | 244/102 R |
| 5,358,201 | A | * | 10/1994 | Brown, Sr. | 244/108 |
| 5,360,185 | A | * | 11/1994 | Derrien | 244/102 R |
| 5,444,348 | A | * | 8/1995 | Garrec | 74/424.71 |
| 5,467,661 | A | * | 11/1995 | Lange | 74/89.39 |
| 5,482,228 | A | * | 1/1996 | Hoshino | 244/102 R |

(Continued)

FOREIGN PATENT DOCUMENTS

| | | |
|---|---|---|
| DE | 717 690 C | 2/1942 |
| GB | 726 573 A | 2/1955 |
| GB | 942 294 A | 11/1963 |

OTHER PUBLICATIONS

Extended European Search Report, dated Feb. 18, 2010, from corresponding European application.

*Primary Examiner* — Michael Carone
*Assistant Examiner* — Steven Hawk
(74) *Attorney, Agent, or Firm* — Brooks Kushman P.C.

(57) ABSTRACT

An undercarriage for a rotary wing aircraft, includes a tubular structure (7) with skids, the tubular structure (7) being designed to be mounted under or in a bottom portion (4) of the aircraft, the undercarriage being characterized in that the tubular structure (7) includes left and right longitudinal portions that are retractable, each of which portions is suitable for moving between a retracted position in a cruising flight configuration and a deployed configuration in a landing configuration.

20 Claims, 1 Drawing Sheet

U.S. PATENT DOCUMENTS

| | | | | |
|---|---|---|---|---|
| 5,499,547 A * | 3/1996 | Nagai et al. | | 74/89.34 |
| 5,622,251 A * | 4/1997 | Rantanen | | 74/424.78 |
| 5,678,847 A * | 10/1997 | Izawa et al. | | 280/5.515 |
| 5,809,833 A * | 9/1998 | Newport et al. | | 74/89.37 |
| 5,836,462 A * | 11/1998 | Liljedahl | | 254/7 R |
| 5,875,994 A * | 3/1999 | McCrory | | 244/102 A |
| 6,427,942 B2 * | 8/2002 | Howard et al. | | 244/108 |
| 6,453,761 B1 * | 9/2002 | Babinski | | 74/89.34 |
| 6,854,689 B1 * | 2/2005 | Lindahl et al. | | 244/102 R |
| 7,178,759 B2 * | 2/2007 | Rouyre | | 244/102 A |
| 7,575,193 B2 * | 8/2009 | Payen et al. | | 244/102 R |
| 8,074,930 B2 * | 12/2011 | Sibley | | 244/102 R |
| 8,291,782 B1 * | 10/2012 | Shaheen et al. | | 74/89.34 |
| 2005/0269887 A1 * | 12/2005 | Blanding et al. | | 74/89.34 |
| 2006/0027706 A1 * | 2/2006 | Lindahl et al. | | 244/102 R |
| 2006/0113933 A1 * | 6/2006 | Blanding et al. | | 318/116 |
| 2007/0181744 A1 * | 8/2007 | Bietenhader | | 244/108 |
| 2012/0210810 A1 * | 8/2012 | Nakamura et al. | | 74/89.34 |

* cited by examiner

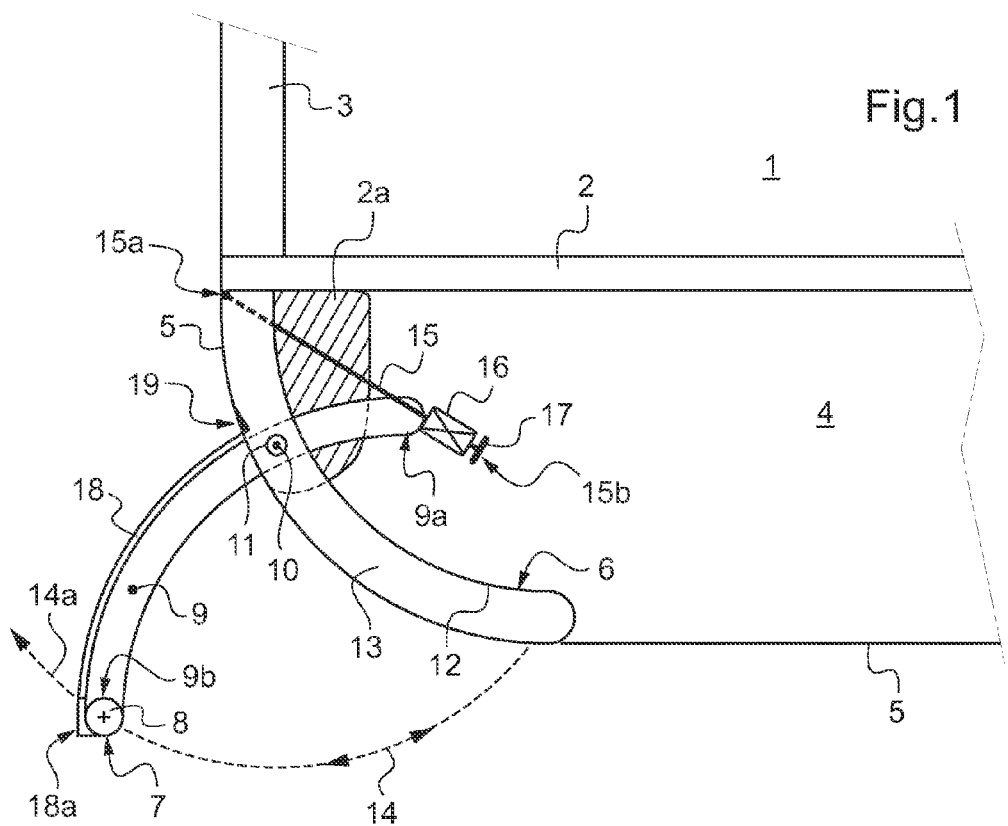
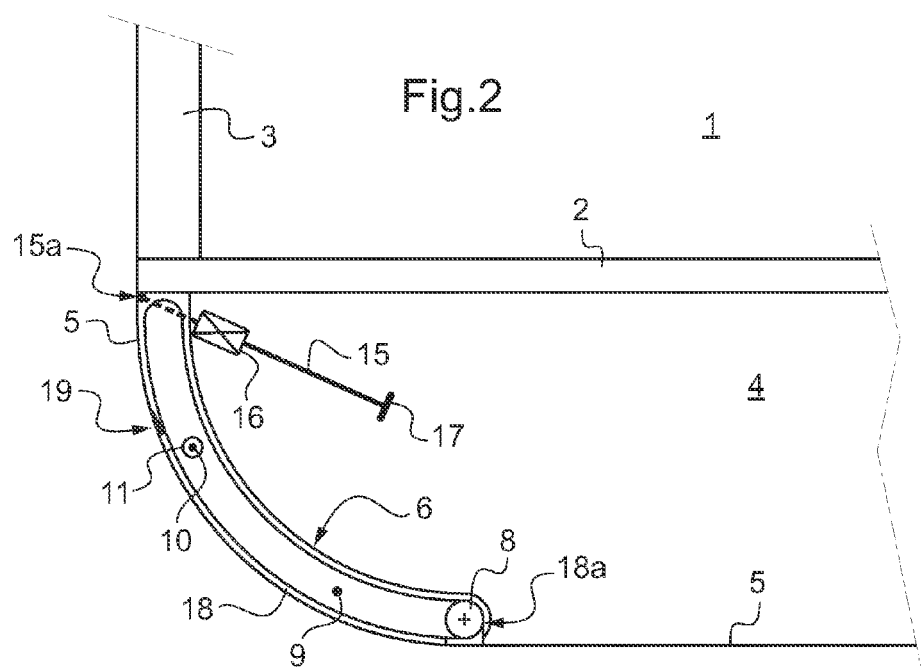

RETRACTABLE UNDERCARRIAGE FOR AN AIRCRAFT

FIELD OF THE INVENTION

The present invention relates to the general technical field of rotary wing aircraft in general, and more particularly to aircraft that are helicopters. The invention relates more particularly to the undercarriage of such aircraft.

The description below refers more particularly to helicopters. However, the invention is not limited to aircrafts of this variety only.

Helicopters are suitable for taking off and landing on trajectories that are vertical, and they therefore do not necessarily require wheels to be incorporated in their undercarriages. Consequently, undercarriages are known that have skids taking the place of wheels.

That kind of rigid undercarriage is fastened beneath or in the bottom area of the helicopter in known manner.

BACKGROUND OF THE INVENTION

Thus, an undercarriage for a rotary wing aircraft is known that includes for example a tubular structure with skids. The tubular structure is designed to be mounted in the bottom portion of the aircraft. The tubular structure is generally fastened to a rigid structure that extends under the floor of the aircraft cabin.

Known tubular structures need to be capable of withstanding high levels of stress. During a vertical landing, the undercarriage needs to be capable of absorbing the kinetic energy of the aircraft making contact with the ground, without generating deformation in the structure of said aircraft.

In addition, the undercarriage is subjected to high levels of motion and/or loads, e.g. generated by the rotor of a helicopter.

Under no circumstances, the tubular structure must present physical properties that encourage a resonance phenomenon appearing on the ground, since that can damage the aircraft severely.

Known tubular structures are normally made of metal or composite material and present continuous tubular portions interconnecting the left and right halves of the undercarriage.

The connecting tubular portions generally pass through the bottom portion of the aircraft situated under the cabin.

Nevertheless, the tubular structures constituting known undercarriages, present a certain number of drawbacks.

Such tubular structures harm the aerodynamics of the aircraft and consequently lead to increased fuel consumption by the aircraft.

Furthermore, existing tubular structures have an unfavorable influence on the appearance of the aircraft while it is in flight.

It is also known with the help of document GB 942 294, an undercarriage for a rotary air wing aircraft. The undercarriage includes a tubular structure with skids, said tubular structure being designed to be mounted under or in a bottom portion of the aircraft. The tubular structure comprises left and right longitudinal portions that are retractable and comprise the skids. Each portion is suitable for moving between a retracted position in a cruising flight configuration and a deployed position in a landing configuration.

OBJECTS AND SUMMARY OF THE INVENTION

Consequently, an object of the invention is to provide a novel undercarriage that does not present the above-mentioned drawbacks.

Another object to the invention is to improve undercarriages, of the kind comprising a tubular structure with skids, but without increasing the weight of the aircraft.

Another object to the invention is to improve undercarriages by using simple and reliable drive means.

The invention also seeks to provide an undercarriage that is capable, without damage, of absorbing firstly the impacts that result from vertically landing, and secondly the motion generated by the aircraft.

The objects given to the invention are achieved with the help of An undercarriage for a rotary wing aircraft, the undercarriage including a tubular structure with skids, said tubular structure being designed to be mounted under or in a bottom portion of the aircraft, the tubular structure comprising left and right longitudinal portions that are retractable and comprise the skids, each of which portions is suitable for moving between a retracted position in a cruising flight configuration and a deployed configuration in a landing configuration, wherein the undercarriage includes drive means for moving the left and right longitudinal portions from the retracted position towards the deployed position, and vice versa, characterized in that, for each pivot arm, the drive means comprise a respective threaded rod having one end that is free and having its other end that is designed to be hinged to a stationary support, said threaded rod passing through one end, referred to as the inside end of the corresponding pivot arm, the drive means also comprising a self-supporting electric or hydraulic motor, which motor moves on said threaded rod, and against which the inside end of the pivot arm comes to bear.

In an embodiment in accordance with the invention, each longitudinal portion includes a front pivot arm and a rear pivot arm, which arms are interconnected at one of their ends, referred to as their outside ends, by constituting the skid.

In an embodiment in accordance with the invention, the front and rear pivot arms are tubes that are identical or similar to the tubular shape of the skid, and that the front and rear pivot arms are connected firmly to the skid to form a pivot assembly.

In an embodiment in accordance with the invention, each pivot arm includes a pivot inserted in a resilient sleeve for damping the motion transmitted to said undercarriage, as a function of frequencies of the rotor system.

In an embodiment in accordance with the invention, the drive means are associated with electrical or hydraulic control means.

In an embodiment in accordance with the invention, the pivot arms and/or the skids are made of a metal, such as aluminum or any other light weight metal.

In an embodiment in accordance with the invention, the pivot arms and/or the skids are made of a reinforced composite material.

In an embodiment in accordance with the invention, the pivot arms and/or the skids are made of a hybrid material based on metal and a reinforced composite material such as glass fiber or carbon fiber.

The objects given to the invention are also achieved by an aircraft having an undercarriage as described above.

In an embodiment in accordance with the invention, the aircraft includes a structure based on rigid beams defining a cabin, a floor, and the bottom portion extending under the floor, the undercarriage being arranged in said bottom portion.

In an embodiment in accordance with the invention, the left and right longitudinal portions are pivotally mounted to the structure based on rigid beams.

In an embodiment in accordance with the invention, the bottom portion includes recesses forming housings in which the arms and the skids are received when they are in their retracted position.

In an embodiment in accordance with the invention, the bottom portion is defined in part by at least one stationary outer shell covering said bottom portion apart from the recesses.

In an embodiment in accordance with the invention, the bottom portion comprises one recess on each side for receiving the corresponding tubular structure.

In an embodiment in accordance with the invention, the bottom portion also includes on each side a movable outer shell part extending longitudinally from the rear pivot arm to the front pivot arm and also extending over a fraction of the length of said pivot arms so that, in the retracted position of said pivot arms, it covers the recess.

In another embodiment in accordance with the invention, the bottom portion comprises on each side a recess comprising a longitudinal part for receiving the skid and up right parts for receiving the pivot arms.

In another embodiment in accordance with the invention, the bottom portion also includes on each side, movable outer shell parts affixed to the pivot arms and to the skid, so that, in the retracted position of said pivot arms, the shell parts cover respectively the longitudinal and the up right parts of the recess.

In an embodiment in accordance with the invention, the aircraft comprises elastomeric lips which form an interface providing sealing between the stationary outer shell and the movable parts of the undercarriage in the retracted position.

By way of example, and the aircraft in accordance with the invention constitutes a helicopter.

The undercarriage in accordance with invention presents the advantage of considerably improving the aerodynamics of the aircraft while the undercarriage is in the retracted position, and consequently of substantially reducing the fuel consumption of the aircraft compared with a model having the same power and fitted with a conventional undercarriage. This advantage is even more significant as soon as the aircraft, a helicopter for instance, is flying with a high speed.

Another advantage of the undercarriage in accordance with invention lies in the simplicity of its construction, while nevertheless conserving mechanical properties that are at least as good as those of a conventional tubular structure. This makes it possible to obtain a better cost price and easy maintenance for an undercarriage in accordance with the invention.

Another advantage of the undercarriage in accordance the invention lies in the possibility of using a hybrid material based on metal and on a reinforced synthetic material, and consequently in the absence of any increase in weight, in spite of using additional elements such as the threaded rods and the motors.

BRIEF DESCRIPTION OF THE DRAWINGS

Other characteristics and advantages also appear from the following detailed description with reference to the accompanying figures given by way of non limiting illustration, and in which:

FIG. 1 is a fragmentary diagram in section showing a portion of an aircraft including an embodiment of an undercarriage in accordance with the invention in a deployed position; and FIG. 2 is a fragmentary diagram in section showing a portion of an aircraft including an embodiment of an undercarriage in according to the invention in a retracted position.

MORE DETAILED DESCRIPTION

FIG. 1 and FIG. 2 show an embodiment of an undercarriage in accordance with the invention.

FIGS. 1 and 2 show, in section, a part of a helicopter together with a part of an undercarriage, in accordance with the invention.

The helicopter has a cabin 1 defined in part by a reinforced structure and by a floor 2. The reinforced structure is made in part on the basis of beams 3.

The beams 3 advantageously extend to under the floor 2, in such a manner as to define a boundary of a bottom portion 4 under which or in which the undercarriage is mounted. This bottom portion can include a tank and/or other equipments.

Additional beams may also be provided on the under face of the floor 2 to constitute a portion of the bottom portion 4.

The bottom portion 4 advantageously presents an outside shape that is rounded in order to optimize the aerodynamics of the helicopter.

A stationary outer shell 5 covers the bottom portion 4 with the exception of recesses 6. The recesses 6 are partly shown in the figures.

The undercarriage comprises a tubular structure 7 made up of skid 8 that is substantially horizontal and that constitutes part of a landing means, together with pivot arms 9 that extends in a plane that is substantially vertical and transversal to the aircraft.

Each pivot arm 9, e.g. presenting a substantially curved shape, is mounted on the bottom portion 4 via a pivot 10. The pivot 10 is advantageously inserted in a resilient sleeve 11. Such a hinge is already known.

In a preferred embodiment, the pivot arm 9 present a general concave shape. The pivot arm 9 is shaped between of the pivot 10 and the skid 8, so that the skid 8 is set aside, in the outside direction of the landing means, with respect of the pivot 10.

Each longitudinal portion comprises, in a preferred embodiment, two pivot arms 9.

The undercarriage according to the invention comprises also in a preferred embodiment, a reinforced area 2a, near each pivot 10, for transmitting at least partly the landing loads into the aircraft structure which comprises the beams 3 and the floor 2.

The recess 6, which is not covered by the outer shell 5, is defined towards the inside of the bottom portion 4, for example by a special conformation 12 of a part of the outer shell 5. This special conformation is made by any known means. Together with the recess 6, the special conformation 12 constitutes a housing 13 for the arm 9 and also for the skid 8.

FIG. 2 shows a configuration in which the undercarriage is retracted, i.e. the arm 9 and the skid 8 are disposed inside the housing 13. The special conformation 12 advantageously constitutes an abutment for the arm 9 and, where appropriate, also for the skid 8.

The movement of the arm 9 is represented by arrows 14 and 14a identified in FIG. 1. In a deployed configuration of the pivot arms 9, shown for example in FIG. 1, the pivot arms 9 are set in an angular position which is defined along a path illustrated with the arrows 14 and 14a. This angular position is set to optimize the elastic deformation of the longitudinal portions during the landing.

The undercarriage in accordance with invention also includes drive means for moving the arm 9. For each arm 9, the drive means comprise a threaded rod 15 and an electric or hydraulic motor 16 that is self-supporting on said threaded rod 15.

One end 15a, 15b of the threaded rod 15 is hinged to a stationary point of the structure of the bottom portion 4. The other end 15b is free and includes an abutment 17 for defining the travel of the motor 16.

The threaded rod 15 passes freely through an inside end 9a of the arm 9 via a hole, which end comes into abutment against the motor 16.

Movement of the motor 16 along the threaded rod 15 thus causes the arm 9 to pivot.

Movement of the motor 16 towards the end 15a causes the arm 9 to move from a deployed position (FIG. 1) towards a retracted position (FIG. 2).

Movement of the motor 16 towards the end 15b enables the arm 9 to be deployed under the effect of its own weight.

When the arm 9 moves, the threaded rod 15 also pivots along a circular arc, around its anchor point.

The drive means are advantageously associated with electrical or hydraulic actuators and control means (not shown).

In another embodiment of the undercarriage (not shown), the movement of the pivot arms 9 can be obtained by any other known means such as a cog rail with a motor driven cog wheel. Any other suitable means for moving the tubular structure could also be used.

The outer shell 5 covers the bottom portion 4 with the exception of the recesses 6. In order to optimize the aerodynamics of the helicopter, it is also appropriate to cover the recesses 6 when the undercarriage is in its retracted position.

The skid 8 extends between a rear arm 9 and a front arm 9 corresponding substantially to the longitudinal extent of the undercarriage. The recess 6 therefore extends over the same length.

The bottom portion 4 includes a movable outer shell part 18 that extends longitudinally from the rear arm 9 to the front arm 9 and it is fastened to said arms 9.

Thus, when the arm 9 is in a retracted position, as shown for example in FIG. 2, the movable shell 18 covers the recess 6 over a length that extends between the front and rear arms 9. The movable outer shell 18 therefore extends longitudinally from the rear pivot arm 9 to the front pivot arm 9, and also over a fraction of the length of said pivot arms 9 so that in the retracted position of said pivot arms 9, it covers the hall recess 6 or the portion that is not covered by the stationary outer shell 5.

In another embodiment, the bottom portion 4 comprises on each side a recess 6 comprising a longitudinal part for receiving the skid 8 and up right parts for receiving the pivot arms 9. The bottom portion 4 also includes on each side, movable outer shell parts 18 and 18a respectively affixed to the pivot arms 9 and to the skid 8, so that, in the retracted position of said pivot arms 9, the shell parts 18a and 18 respectively cover the longitudinal and the up right parts of the recess 6.

In order to improve aerodynamics, provision is made to use elastomer lips 19 or gaskets to provide the interface between the stationary outer shell 5 and the adjacent movable shell part 18 and 18a. The lips 19 thus provide sealing for the outer fairing of the bottom portion 4 and contribute to improving the aerodynamics of the aircraft.

The invention claimed is:

1. An undercarriage for a rotary wing aircraft, the undercarriage including a tubular structure with skids, said tubular structure being designed to be mounted under or in a bottom portion of the aircraft, the tubular structure comprising left and right longitudinal portions that are retractable, each of the left and right longitudinal portions comprising a pivot arm having an inside end and an outside end connected to a respective one of the skids, each of the left and right longitudinal portions being suitable for moving between a retracted position in a cruising flight configuration and a deployed configuration in a landing configuration, wherein the undercarriage includes drive means for moving the left and right longitudinal portions between the retracted position and the deployed position, characterized in that, for each pivot arm, is provided with a pivot positioned between the inside end and the outside end, the drive means comprise a respective threaded rod having a rod free end and a rod fixed end that is designed to be hinged to a stationary support, said threaded rod passing through the inside end of the corresponding pivot arm, the drive means also comprising a self-supporting electric or hydraulic motor, which motor moves on said threaded rod, and against which the inside end of the pivot arm comes to bear.

2. An undercarriage according to claim 1, characterized in that each longitudinal portion includes a front pivot arm and a rear pivot arm, the arms being interconnected by the skid.

3. An undercarriage according to claim 1, characterized in that each longitudinal portion includes a front pivot arm interconnected with a rear pivot arm, the front and rear pivot arms being tubes that are identical or similar to the tubular shape of the skid, and the front and rear pivot arms being connected firmly to the skid to form a pivot assembly.

4. An undercarriage according to claim 1, characterized in that each pivot arm includes a pivot inserted in a resilient sleeve for damping the motion transmitted to said undercarriage as a function of frequencies of the rotor system.

5. An undercarriage according to claim 1, characterized in that the drive means are associated with electrical or hydraulic control means.

6. An undercarriage according to claim 1, characterized in that the pivot arms and/or the skids are made of a metal.

7. An undercarriage according to claim 1, characterized in that the pivot arms and/or the skids are made of a reinforced composite material.

8. An undercarriage according to claim 1, characterized in that the pivot arms and/or the skids are made of a hybrid material based on metal and a reinforced composite material.

9. An aircraft having at least one rotary wing, characterized in that the aircraft includes an undercarriage according to claim 1.

10. An aircraft according to claim 9, characterized in that the aircraft includes a structure based on rigid beams defining a cabin, a floor, and the bottom portion extending under the floor, the undercarriage being arranged in said bottom portion, and that the left and right longitudinal portions are pivotally mounted to the structure based on rigid beams.

11. An aircraft according to claim 9, characterized in that the bottom portion includes recesses forming housings in which the arms and the skids are received when the left and right longitudinal portions are in the retracted position.

12. An aircraft according to claim 11, characterized in that the bottom portion is defined in part by at least one stationary outer shell covering said bottom portion apart from the recesses.

13. An aircraft according to claim 12, characterized in that the bottom portion comprises one recess on each side for receiving the corresponding tubular structure.

14. An aircraft according to claim 13, characterized in that the bottom portion also includes on each side a movable outer shell part extending longitudinally from the rear pivot arm to the front pivot arm and also extending over a fraction of the length of said pivot arms so that, in the retracted position of said pivot arms, the movable outer shell part covers the recess.

15. An aircraft according to claim 12, characterized in that the bottom portion comprises on each side a recess comprising a longitudinal part for receiving the skid and up right parts for receiving the pivot arms.

16. An aircraft according to claim 15, characterized in that the bottom portion also includes on each side, movable outer shell parts affixed to the pivot arms and to the skid, so that, in the retracted position of said pivot arms, the shell parts respectively cover the longitudinal and the up right parts of the recess.

17. An aircraft according to claim 12, characterized in that elastomeric lips form an interface providing sealing between the stationary outer shell and the movable parts of the undercarriage in the retracted position.

18. An aircraft according to claim 12, characterized in that the aircraft constitutes a helicopter.

19. An undercarriage according to claim 2, characterized in that the front and rear pivot arms are tubes connected firmly to the skid to form a pivot assembly.

20. An undercarriage for a rotary wing aircraft, the undercarriage including a tubular structure with skids, said tubular structure being designed to be mounted under or in a bottom portion of the aircraft, the tubular structure comprising retractable left and right longitudinal portions, each of the left and right longitudinal portions comprising a pivot arm having an inside end, an outside end and a pivot disposed between the inside end and outside end, each of the outside ends being connected to a respective one of the skids, the left and right longitudinal portions being movable between a retracted position and a deployed configuration, the undercarriage including a driver for moving the left and right longitudinal portions between the retracted position and the deployed position, the driver comprising a threaded rod having a rod free end and a rod fixed end hinged to a stationary support, the threaded rod passing through the inside end of one of the pivot arms, the driver comprising a self-supporting motor that is movable on the threaded rod and against which the inside end of the one pivot arm comes to bear.

* * * * *